United States Patent
Sun et al.

(10) Patent No.: US 12,187,362 B2
(45) Date of Patent: Jan. 7, 2025

(54) STEERING CONTROL DEVICE AND METHOD FOR VEHICLE

(71) Applicant: HL MANDO CORPORATION, Gyeonggi-do (KR)

(72) Inventors: TaeHyung Sun, Gyeonggi-do (KR); Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 171 days.

(21) Appl. No.: 17/900,869

(22) Filed: Sep. 1, 2022

(65) Prior Publication Data
US 2023/0068424 A1 Mar. 2, 2023

(30) Foreign Application Priority Data
Sep. 1, 2021 (KR) .......... 10-2021-0116211

(51) Int. Cl.
*B62D 5/04* (2006.01)
*B62D 6/00* (2006.01)

(52) U.S. Cl.
CPC ......... *B62D 5/0484* (2013.01); *B62D 5/0469* (2013.01); *B62D 6/00* (2013.01)

(58) Field of Classification Search
CPC ........ B62D 5/04; B62D 5/0457; B62D 5/046; B62D 5/0463; B62D 5/0469; B62D 5/0481; B62D 5/0484; B62D 5/0487; B62D 5/049; B62D 5/0493; B62D 5/0496; B62D 6/00; B62D 6/001; B62D 6/002; B62D 6/003; B62D 6/005; B62D 6/008; B62D 6/02; B62D 6/04; B62D 6/06; B62D 6/10

See application file for complete search history.

(56) References Cited

U.S. PATENT DOCUMENTS 11,046,360 B2 * 6/2021 Jin ................ B62D 5/0463
2022/0315105 A1 * 10/2022 Kuragaki ............ B62D 15/025

FOREIGN PATENT DOCUMENTS

| DE | 198 41 913 | 3/2000 |
| DE | 10 2016 208 775 | 11/2017 |
| JP | 2020192936 A | * 12/2020 |

OTHER PUBLICATIONS

Arogeti et al., Fault Detection Isolation and Estimation in a Vehicle Steering System, 2012, IEEE (Year: 2012).*
Office Action dated Sep. 25, 2024 for German Patent Application No. 10 2022 122 122.9 and its English translation provided by Applicant's foreign counsel.

* cited by examiner

*Primary Examiner* — Russell Frejd
*Assistant Examiner* — Sara J Lewandroski
(74) *Attorney, Agent, or Firm* — WOMBLE BOND DICKINSON (US) LLP

(57) ABSTRACT

The present embodiments relates to a steering control device and method of a vehicle and may provide a steering control device and method for a vehicle, which may secure stably steered driving by controlling the output of the steering motor by changing the average steering ratio when the driver causes urgent steering in a failure situation and adjusting the rack stroke and rack speed.

12 Claims, 8 Drawing Sheets

STEERING CONTROL DEVICE AND METHOD FOR VEHICLE

CROSS-REFERENCE TO RELATED APPLICATION

This application claims priority from Korean Patent Application No. 10-2021-0116211, filed on Sep. 1, 2021, which is hereby incorporated by reference for all purposes as if fully set forth herein.

BACKGROUND

Field

The present embodiments relate to a steering control device and method for a vehicle.

Description of Related Art

Vehicle steering system refers to a system in which the driver of a vehicle may change the steering angle of the wheels of a vehicle based on the steering force (or rotational force) applied to the steering wheel. The electric power steering system (EPS) has been applied to vehicles to reduce the steering force of the steering wheel to ensure the stability of the steering state. There has been ongoing vigorous research on steer-by-wire-based vehicle steering devices. In such a steer-by-wire-based vehicle steering device, the steering column module connected to the steering wheel and the steering rack module connected to the wheels are mechanically separated from each other. Therefore, the steer-by-wire-based vehicle steering device does not have to match the angles of the steering wheel and the wheel, so it is possible to freely change the angles of the steering wheel and the wheel.

In particular, in vehicle steering systems, increasing interest switches from systems conventionally using a single controller for controlling the vehicle to redundant system-applied steering adopting two or more controllers to control vehicle steering. However, if one controller fails in the steering control system implementing the redundant system, it is very limited to provide steering assistance power required by the driver only with the remaining normal controllers. Accordingly, a need exists for a technology capable of providing stable steering assistance even when a failure or accident occurs and the driver performs emergency steering.

BRIEF SUMMARY

In the foregoing background, the present embodiments may provide a steering control device and method for a vehicle, which may secure stably steered driving by controlling the output of the steering motor by changing the average steering ratio when the driver causes emergency steering in a failure situation and adjusting the rack stroke and rack speed.

In an aspect, the present embodiments may provide a steering control device of a vehicle, comprising a condition determining unit determining a steering ratio change condition by determining whether a failure or emergency steering occurs in a steering motor or steering motor control device of the vehicle equipped with a steer-by-wire system, a steering ratio change unit changing an average steering ratio using a preset virtual C-factor when the steering ratio change condition is determined to be met, and a controller controlling a steering motor output and adjusting a rack stroke and a rack speed based on the changed average steering ratio.

In another aspect, the present embodiments may provide a steering control method of a vehicle, comprising a condition determining step determining a steering ratio change condition by determining whether a failure or emergency steering occurs in a steering motor or steering motor control device of the vehicle equipped with a steer-by-wire system, a steering ratio change step changing an average steering ratio using a preset virtual C-factor when the steering ratio change condition is determined to be met, and a control step controlling a steering motor output and adjusting a rack stroke and a rack speed based on the changed average steering ratio.

According to the present embodiments, there may be provided a steering control device and method for a vehicle, which may secure stably steered driving by controlling the output of the steering motor by changing the average steering ratio when the driver causes emergency steering in a failure situation and adjusting the rack stroke and rack speed.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
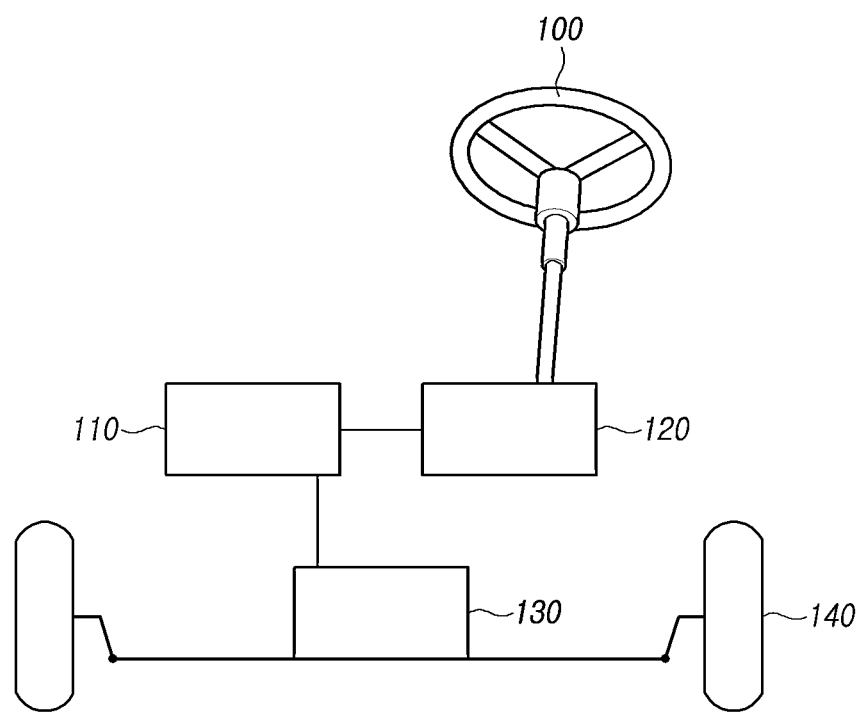
FIG. 1 is a view illustrating an overall configuration of a steer-by-wire-based steering device according to an embodiment of the disclosure.

The disclosure relates to a vehicle steering control device and method.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a view illustrating an overall configuration of a steer-by-wire-based vehicle steering device according to an embodiment of the disclosure.

Referring to FIG. 1, a steer-by-wire-based vehicle steering device according to an embodiment of the disclosure may include a steering wheel 100, a steering column module (SCM) 120, a steering rack module (SRM) 130, a control module 110, and a wheel 140.

The steering wheel 100 may be operated by the driver's manipulation. For example, the steering wheel 100 may be rotated by the driver's manipulation and, based thereupon, may determine or change the direction of the vehicle.

The steering column module 120 may be connected with the steering wheel 100. The steering column module 120 may include a steering shaft, a reaction force motor, and each sensor. For example, the steering shaft may be connected with the steering wheel 100. If the steering wheel 100 rotates, the steering shaft may rotate in response to the rotating steering wheel 100. The reaction force motor may be connected with the steering shaft. The reaction force motor may rotate in a direction opposite to the rotation direction of the steering wheel 100 to provide a steering reaction force to the steering wheel 100 so that the driver may have an appropriate steering feeling. Each sensor may include at least one of a steering angle sensor, a torque sensor, or a steering angle speed sensor. However, the type of the sensor is not limited thereto as long as it may measure the states of various components included in the steering column module 120. For example, the steering angle sensor may measure the steering angle, which is the rotation angle of the steering wheel 100. The torque sensor may measure the torque generated at the steering shaft as the steering wheel 100 rotates. The steering angle speed sensor may measure the steering angle speed, which is the rotation angular speed of the steering wheel 100.

The steering rack module 130 may be mechanically separated from the steering column module 120. The steering rack module 130 may include a steering motor (driving motor), a pinion, a rack, and each sensor. For example, the steering motor may be driven by a driving current. The steering motor may generate a driving torque corresponding to the driving current and may provide a steering force to the steering wheel 100 based on the generated driving torque. The pinion may be connected with the steering motor. The pinion may rotate based on the driving torque generated by the steering motor. The rack may be connected with the pinion. The rack may perform a linear motion based on the rotation of the pinion. In other words, the pinion and the rack may provide a steering force to the steering wheel 100 based on the driving torque of the steering motor to change the direction of the steering wheel 100. Each sensor may include at least one of a rack position sensor, a rack displacement sensor, a pinion angle sensor, or a pinion angular speed sensor. However, the type of the sensor is not limited thereto as long as it may measure the states of various components included in the steering rack module 130. For example, the rack position sensor may measure the position of the rack, and the rack displacement sensor may measure the displacement of the rack. The pinion angle sensor may measure the angle of the pinion, which is the rotation angle of the pinion. The pinion angular speed sensor may measure the angular speed of the pinion, which is the rotation angular speed of the pinion.

The control module 110 may control the operation of the steering column module 120 and the steering rack module 130. For example, the control module 110 may receive information from each of the components included in the steering column module 120 and the steering rack module 130, generate a steering control signal using the received information, and control the operation of each component included in the steering column module 120 and the steering rack module 130 based on the generated steering control signal. As another example, the control module 110 may control the operation of each sensor disposed to the vehicle. The control module 110 may control the operation of each sensor disposed to the vehicle, generate each control signal based on each piece of information therefrom, and control the operation of each component included in the steering column module 120 and the steering rack module 130 using each generated control signal. The control module 110 may mean a steering control device. The control module 110 is described below in detail with reference to FIGS. 2 to 8.

The wheel 140 may be connected with the steering rack module 130. For example, the rotational force of the steering motor may be converted into a linear motion force in the axial direction of the rack while being transferred to the rack bar using a reducer provided between the steering motor and the rack bar. The linear motion force of the rack may be transferred to the wheel 140 connected through a tie rod and a knuckle arm.

Figure 2:
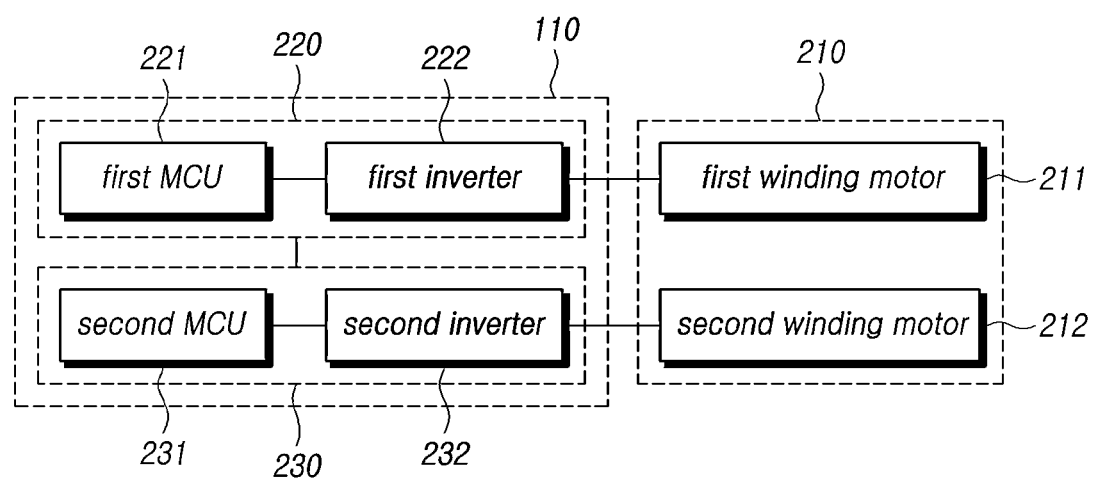
FIG. 2 is a view illustrating a configuration of a steering device of a vehicle to which a redundant system is applied according to an embodiment of the disclosure.

FIG. 2 is a view illustrating a configuration of a steering device of a vehicle to which a redundant system is applied according to an embodiment of the disclosure.

Referring to FIG. 2, the steering device 110 of the vehicle according to an embodiment of the disclosure may implement a redundant system including a plurality of steering motor control devices. For example, the plurality of steering motor control devices 220 and 230 may be implemented with an electronic control unit (ECU) including a motor control unit (MCU), an inverter and a printed circuit board (PCB) (not shown), and software. For example, the first steering motor control device 220 may include a first MCU 221 and a first inverter 222, and the second steering control device 230 may include a second MCU 231 and a second inverter 232. However, embodiments of the disclosure are not limited thereto.

Further, the steering devices 110 of the vehicle may be electrically connected to each other to implement a redundant system. For example, the first steering motor control device 220 and the second steering motor control device 230 may be electrically connected. By being connected therebetween, the plurality of steering motor control devices may internally perform mutual communication and transfer or receive their respective state information. As a specific example, when the first steering motor control device 220 is in a failure (or abnormal) state, the first steering motor control device 220 may output an electrical indicating the state information about the first steering motor control device 220 to the second steering motor control device 230. The second steering motor control device 230 may receive the electrical signal output from the first steering motor control device 220 to recognize the state of the first steering motor control device 220. In this case, the electrical signal may be implemented in the form of a flag.

In the steering device 110 of the vehicle, a plurality of winding motors included in the dual-winding steering motor 210 may be electrically connected respectively to the steering motor control devices. For example, the first inverter 222 included in the first steering motor control device 220 may be electrically connected to the first winding motor 211 included in the steering motor 210. The second inverter 232 included in the second steering motor control device 230 may be electrically connected to the second winding motor 212 included in the steering motor 210.

The steering motor control devices 220 and 230 may calculate a target rack stroke based on the steering information and may calculate the target command current corresponding to each target rack stroke. For example, the first MCU 221 included in the first steering motor control device 220 may calculate a target rack stroke and a target command current. In this case, the steering motor control device may calculate a command current for finally applying the target command current to the steering motor 210 considering state information about the other steering motor control device.

Each of the steering motor control devices 220 and 230 may calculate a portion of the target command current when the state of the other steering motor control device is abnormal or fails. For example, when the first steering motor control device 220 and the second steering motor control device 230 are normal or do not fail, the first MCU 221 and the second MCU 231 each may calculate a half of the target command current.

If one of the plurality of steering motor control devices fails, the steering device 110 of the vehicle may perform limited driving on the vehicle using only the remaining, normal steering motor control device to prevent accidents. In other words, the normal steering motor control device may control the steering motor 210 using the command current corresponding to a preset reference rack stroke as a limit range to prevent burnout due to overheating. As a specific example, when the second steering motor control device 230 fails due to an error in, e.g., the second MCU 231 or the second inverter 232, the second steering control device 230 may generate a signal and output the signal to the first steering motor control device 220. If the first steering motor control device 220 receives the failure signal from the second steering motor control device 230, the first steering motor control device 220 may control the first winding motor 211 by using half of the command current corresponding to the end of the rack as a limit range. Accordingly, the range of the rack stroke may be reduced. Accordingly, the steering device 110 of the vehicle may change the average steering ratio to generate the steering motor output at 0% and 100% at a preset period to increase the rack stroke with insufficient output.

Figure 3:
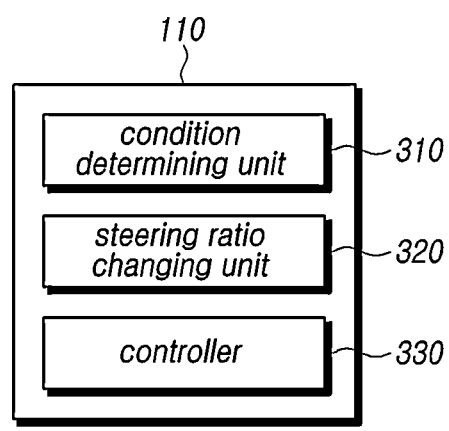
FIG. 3 is a view illustrating a configuration of a vehicle steering control device according to an embodiment.

FIG. 3 is a view illustrating a configuration of a vehicle steering control device according to an embodiment.

Referring to FIG. 3, according to an embodiment of the disclosure, a steering control device 110 of a vehicle may include a condition determining unit 310 determining whether a failure occurs and emergency steering occurs in a steering motor or steering motor control device in the vehicle having the steer-by-wire system to determine a steering ratio change condition, a steering ratio changing unit 320, upon determining that the steering ratio change condition is met, changing the average steering ratio using a preset virtual C-factor, and a controller 330 controlling the steering motor output based on the changed average steering ratio and adjusting the rack stroke and the rack speed.

The condition determining unit 310 may determine the steering ratio change condition by determining whether a failure or emergency steering occurs in the steering motor or steering motor control device of the vehicle equipped with the steer-by-wire system. For example, the condition determining unit 310 may determine that the steering ratio change condition is met when a failure and emergency steering occur. For example, the condition determining unit 310 may determine that a failure occurs if a failure occurrence signal is detected. The failure occurrence signal may be a flag indicating the failure, generated by the steering motor control device. Specifically, the failure occurrence signal may be detected in a situation in which overheating occurs due to an overload to the applied current of the steering motor, or in a situation in which a steering angle sensor or a steering torque sensor of the steering motor control device is incorrectly mounted or malfunctions.

As another example, the condition determining unit 310 may determine that emergency steering occurs if the target rack stroke is larger than a preset reference rack stroke. The condition determining unit 310 may obtain a target rack stroke required by the driver from steering wheel sensor information including steering angle information or steering torque information. The target rack stroke may mean a rack stroke of the rack bar required to generate an appropriate steering assistance force according to steering information. The target rack stroke may mean the output of the steering motor 210 required for the rack bar to linearly move as much as the target. In a case where among the plurality of steering motor control devices, a specific steering motor control device fails, and the steering motor 210 is controlled only with the remaining, normal steering motor control device, the condition determining unit 310 may set the limit rack stroke implementable without overheat damage thereto, as the reference rack stroke. The reference rack stroke may be a rack stroke corresponding to a specific rack force set in proportion to the rack force at two opposite ends of the rack. For example, the condition determining unit 310 may set a rack stroke corresponding to a case in which the rack bar linearly moves at 50% of the maximum output of the steering motor 210 as the reference rack stroke. The maximum output of the steering motor 210 may mean a rack force value at the end of the rack. However, 50% is merely an example, and embodiments of the disclosure are not limited thereto.

When it is determined that the steering ratio change condition is met, the steering ratio change unit 320 may change the average steering ratio according to the preset virtual C-factor. As an example, when it is determined that the steering ratio change condition is met, the steering ratio change unit 320 may change the average steering ratio according to the virtual C-factor set to a value less than 1. In this case, the average steering ratio may be a ratio of the steering angle to angular displacement calculated from rotation angle information about the steering motor corresponding to two opposite ends of the steering wheel. Specifically, the average steering ratio may be the ratio of the steering angle of the steering wheel to the average value of the rotation angle of the steering motor while the steering wheel in the state rotated to the maximum in one direction is rotated to the maximum in the opposite direction. For example, if the virtual C-factor is set to ½ when the average steering ratio is 1:8, the steering ratio change unit 320 may change the average steering ratio to 1:4.

The controller 330 may control the steering motor output and adjust the rack stroke and rack speed based on the changed average steering ratio. For example, the controller 330 may control the output of the steering motor to be repeatedly generated with different values at preset periods by applying the changed average steering ratio. For example, the controller 330 may control to increase the rack stroke by repeatedly generating the output of the steering motor at 0% and 100% of the steering motor output by applying the changed average steering ratio. Accordingly, the controller 330 may provide the effect that steering is possible even at the end of the steering wheel. Further, the controller 330 may control to reduce the speed of the rack moving to two opposite ends of the rack stroke by controlling the output of the steering motor by applying the changed average steering ratio. This may provide stable steered driving by more stably aligning the road wheel actuator (RWA).

Figure 4:
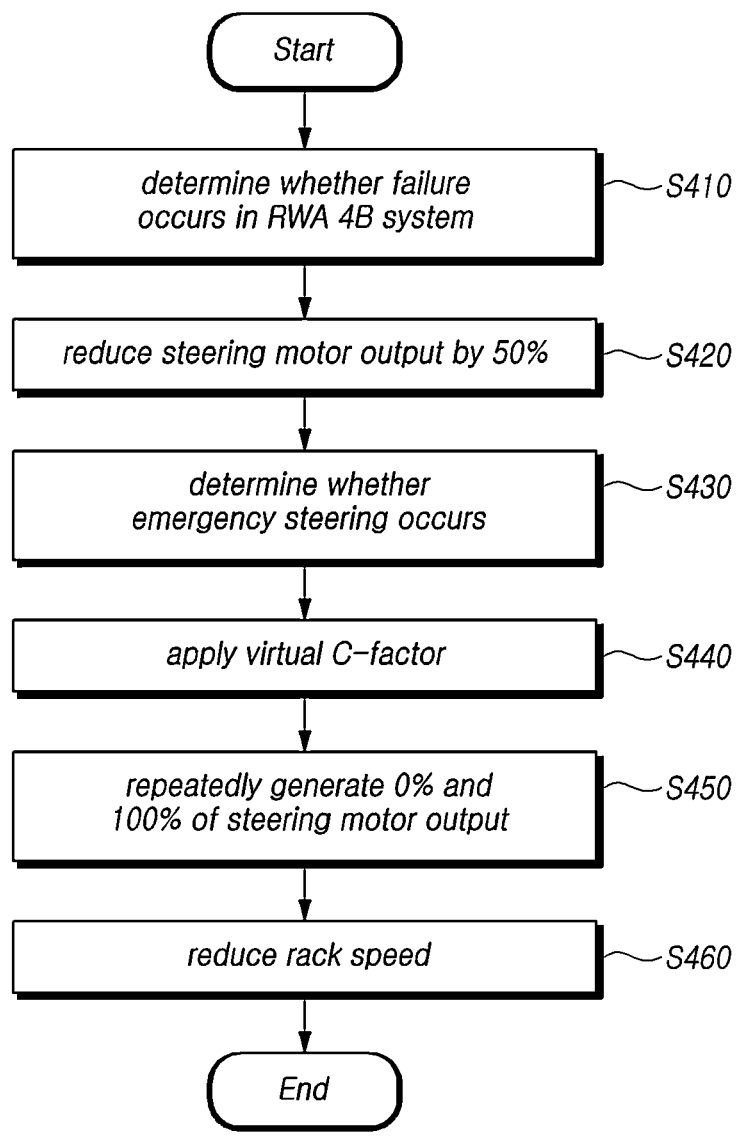
FIG. 4 is a flowchart illustrating an operation of controlling by changing an average steering ratio of a steering control device of a vehicle according to an embodiment of the disclosure.

FIG. 4 is a flowchart illustrating an operation of controlling by changing an average steering ratio of a steering control device of a vehicle according to an embodiment of the disclosure.

Described with reference to FIG. 4 is an example operation in which the steering control device 110 of the vehicle according to an embodiment of the disclosure changes the average steering ratio using the virtual C-factor and controls to reduce the rack speed based on the changed average steering ratio.

The condition determining unit 310 may determine whether a failure occurs in the redundant system implemented to include a plurality of steering motor control devices (S410). As an example, the condition determining unit 310 may determine that a failure occurs if a failure occurrence signal due to a failure in the steering motor or the steering motor control device is detected. For example, the condition determining unit 310 may determine that a failure occurs upon detecting a failure occurrence signal generated from the steering motor control device connected with a steering motor when a failure occurs due to an overload to the current applied to the steering motor or a defect in, e.g., the stator, rotator, or bearing of the steering motor. Or, when a failure occurs due to a defect in various sensors, a failure occurs due to a defect in the inverter, or a failure occurs due to a defect in the steering motor control device itself, a failure occurrence signal is generated from the corresponding steering motor control device and, based thereupon, the condition determining unit 310 may determine that a failure occurs.

The condition determining unit 310 may identify that the steering motor output is reduced by 50% if the failure occurrence signal is detected (S420). As an example, when the steering control device 110 of the vehicle is a redundant system implemented to include a plurality of steering motor control devices, the steering control device 110 may perform limited steering on the vehicle using only a normal steering motor or steering motor control device to prevent accidents. Accordingly, as only the normal steering motor or steering motor control device is used if a failure occurrence signal is detected, the condition determining unit 310 may identify that the steering motor output is reduced by 50%.

The condition determining unit 310 may determine whether emergency steering occurs (S430). As an example, the condition determining unit 310 may determine whether emergency steering occurs in conjunction with various sensors of the vehicle, such as the steering angle sensor, yaw rate sensor, and vehicle velocity sensor. For example, when a preset steering angle speed corresponds to a reference value or more according to the driver's steering wheel manipulation, the condition determining unit 310 may determine that emergency steering occurs. As another example, the condition determining unit 310 may determine that emergency steering occurs if the target rack stroke is larger than a preset reference rack stroke. The target rack stroke is a value calculated from the steering angle information or steering torque information which is changed depending on whether the driver manipulates the steering wheel and may be obtained from the steering wheel sensor information. The reference rack stroke may be set to a rack stroke corresponding to a specific rack force set in proportion to the rack force at two opposite ends of the rack. For example, the reference rack stroke may be set to the rack stroke at the point corresponding to half the rack force at two opposite ends of the rack. Further, the reference rack stroke is a value corresponding to the reference current for controlling the steering motor within a range in which the steering motor control device is not damaged due to overheating, but is not limited to half of the rack force.

The steering ratio change unit 320 may apply a preset virtual C-factor (S440). As an example, when it is determined that the steering ratio change condition is met, the steering ratio change unit 320 may set the virtual C-factor to a value less than 1. The steering ratio change unit 320 may change the average steering ratio using the set virtual C-factor. Therefore, as the virtual C-factor is set to a value less than 1 and applied, the gear ratio may be reduced.

The controller 330 may control to repeatedly generate 0% and 100% of the steering motor output based on the changed average steering ratio (S450). For example, the controller 330 may increase the rack stroke by repeatedly generating 0% and 100% of the steering motor output at preset periods by applying the changed average steering ratio. For example, when the steering ratio change condition is met, the controller 330 may apply a square wave current having a preset cycle and duty ratio according to the changed average steering ratio to the steering motor using the virtual C-factor, controlling to repeatedly generate 0% and 100% of the steering motor output. The period and the duty ratio may be set to differ according to the target rack stroke. The 0% and 100% values set for the steering motor output are not limited thereto as long as the reference rack stroke or more may be provided.

The controller 330 may control to reduce the rack speed by controlling the steering motor output based on the changed average steering ratio (S460). For example, the controller 330 may control to repeatedly generate 0% and 100% of the steering motor output, thereby increasing the rack stroke to enable steering at two opposite ends. The controller 330 may decrease the gear ratio the moving speed of the rack stroke corresponding to the position of the rack by applying the virtual C-factor set to a value less than 1.

Figure 5:
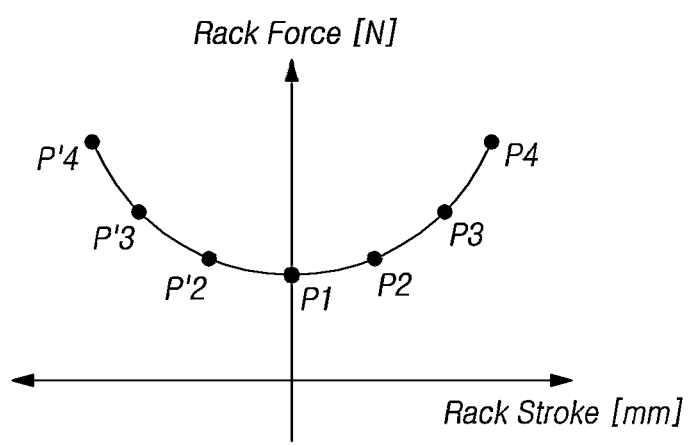
FIG. 5 is a view illustrating a relationship between rack stroke and rack speed in a steering control device of a vehicle according to an embodiment of the disclosure.

FIG. 5 is a view illustrating a relationship between rack stroke and rack speed in a steering control device of a vehicle according to an embodiment of the disclosure.

Referring to FIG. 5, based on the origin P1, which is the center position of the rack, the rack stroke may be increased or decreased in the range of two opposite ends P4 and P'4 of the rack. As the rack stroke moves away from the origin P1 in either direction, the rack bar may make a left or right linear motion. In this case, the x-axis direction may correspond to the position of the rack. For example, +x may mean a state in which the rack bar moves to the right, and −x may mean a state in which the rack bar moves to the left. However, embodiments of the disclosure are not limited thereto.

Further, as the rack stroke increases, the rack force corresponding to the output of the steering motor 210 may non-linearly increase. For example, as the rack stroke increases, the rack force also increases, and the overall graph shape may be a curve passing through P1 to P4. The graph shape may be symmetrical with respect to the y-axis so that P1 to P4 and P'1 to P'4 may also be symmetric.

In the steering control device 110 for a vehicle according to an embodiment of the disclosure, the first steering motor control device 220 among the plurality of steering motor control devices fails, and the steering motor 210 may be controlled only with the second steering motor control device 230. In this case, the second steering motor control device 230 may preset the rack stroke corresponding to the point P2 corresponding to 50% of the rack force value at the ends P4 and P'4 of the rack as the reference rack stroke and store it. If the second steering motor control device 230 is limited to the range of the reference rack stroke set to avoid overheating damage, the driver may feel uncomfortable due to the limited steering and may not prevent unexpected accidents. In contrast, if the second steering motor control device 230 is not limited to the set reference rack stroke range, the internal temperature of the second steering motor control device 230 may sharply rise, and the normal steering control device may be damaged due to overheating. Accordingly, the vehicle steering control device 110 according to an embodiment of the disclosure divides the output of the steering motor 210 into 0% and 100% and repeats them in separate times, thereby controlling to increase the rack stroke by generating the output equal to or more than 50% of the rack force value at the end P4 or P'4. Accordingly, the vehicle steering control device 110 may control to increase the rack stroke beyond the reference rack stroke without overheating.

Figure 6:
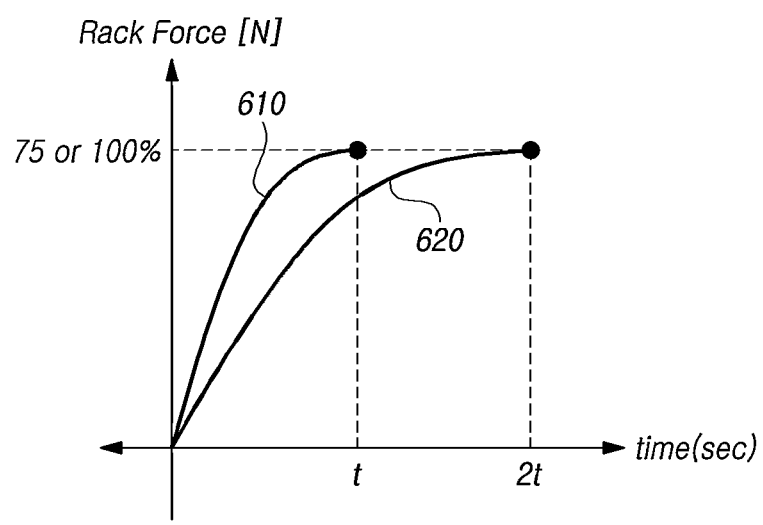
FIG. 6 is a flowchart illustrating an operation of adjusting the rack speed by changing an average steering ratio of a steering control device of a vehicle according to an embodiment of the disclosure.

FIG. 6: a flowchart illustrating an operation of adjusting the rack speed by changing an average steering ratio of a steering control device of a vehicle according to an embodiment of the disclosure.

Described with reference to FIG. 6 is an example operation in which the controller 330 controls the output of the steering motor according to the average steering ratio changed using the virtual C-factor to adjust the rack stroke and the rack speed. FIG. 6 illustrates a rack force graph over time when the virtual C-factor is not applied (610) and a rack force graph over time when the virtual C-factor is applied (620). The rack force graph over time may identify the rack speed.

For example, the steering ratio change unit 320 may set the virtual C-factor to a value less than 1 based on vehicle velocity information and change the average steering ratio. For example, the steering ratio change unit 320 may change the average steering ratio by setting the virtual C-factor to be smaller as the vehicle velocity increases. As a specific example, if the virtual C-factor is set to ½ when the average steering ratio is 1:8, the steering ratio change unit 320 may change the average steering ratio to 1:4. If the vehicle velocity increases, the steering ratio change unit 320 may set the virtual C-factor to ¼ and change the average steering ratio to 1:2. This is because as the vehicle velocity increases, the movement of the vehicle is increased with a small change in steering angle, so that stable steered driving may be achieved by setting a relative smaller average steering ratio for the vehicle at higher speed. However, the average steering ratio value and the virtual C-factor setting value are examples for describing the disclosure, and the disclosure is not limited thereto.

As another example, when the Virtual C-Factor set to a value less than 1 is applied, the controller 333 may control to reduce the rack speed according to the changed average steering ratio. As a specific example, if the controller 333 may control to move the rack stroke at 50 mm per second as much as the limited length when the virtual C-factor is not applied (610), the controller 333 may identify that the rack stroke is moved at 25 mm per second as much as the limited length when the virtual C-factor set to ½ is applied (620). However, the movement distance per second is an example and is not limited thereto. Accordingly, if the virtual C-factor is applied, the rack force graph over time may be changed as shown in FIG. 6.

Figure 7:
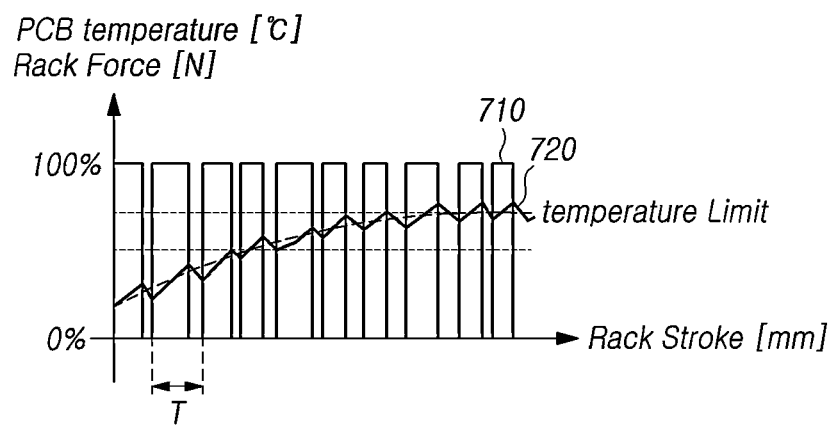
FIG. 7 is a view illustrating an operation of adjusting the rack stroke by controlling the steering motor output of a steering control device of a vehicle according to an embodiment of the disclosure.

FIG. 7 is a view illustrating an operation of adjusting the rack stroke by controlling the steering motor output of a steering control device of a vehicle according to an embodiment of the disclosure.

Described with reference to FIG. 7 is an example operation in which the controller 330 of the steering control device 110 of the vehicle according to an embodiment of the disclosure controls the output of the steering motor and adjusts the rack stroke and rack speed based on the changed average steering ratio.

The controller 330 may change the average steering ratio using the virtual C-factor set to a value less than 1 and generate a larger rack stroke with the same steering motor output as the average steering ratio is changed. Further, the controller 330 may reduce the rack speed by applying the changed average steering ratio. Accordingly, if the changed average steering ratio is applied, the controller 330 may generate a rack stroke at two opposite ends P4 and P4' of the rack with the same steering motor output.

Meanwhile, the controller 330 may control to repeatedly generate the output 710 of the steering motor with different values at a preset period T by applying a square wave current having the preset period T, duty ratio D, and amplitude to the steering motor 210, under the changed average steering ratio. The current may be a current corresponding to the rack stroke. The different values may be set to 0% and 100% of the steering motor output, but is not limited thereto as long as the reference rack stroke and more may be provided. Accordingly, the controller 330 may increase the rack stroke by controlling to repeatedly generate the steering motor output as 0% and 100% of the steering motor output, thereby providing steered driving even at two opposite ends of the rack.

Upon determining that the steering ratio change condition is met, the controller 330 may set the duty ratio of the applied current to differ according to the detected initial internal temperature. For example, the duty ratio may be set to decrease as the initial internal temperature increases and to increase as the initial internal temperature decreases. As a specific example, the controller may 330 increase the internal temperature while the steering motor output of 100% is applied and decrease the internal temperature while the steering motor output is 0%, i.e., not applied. The internal temperature may repeat a rise and a fall until reaching the end P4 or P'4 of the rack. Accordingly, the controller 330 may provide the effect of preventing damage due to overheating by adjusting the time of applying the steering motor output.

A vehicle steering control method that may be performed by the vehicle steering control device 110 described above in connection with FIGS. 1 to 7 is described below.

Figure 8:
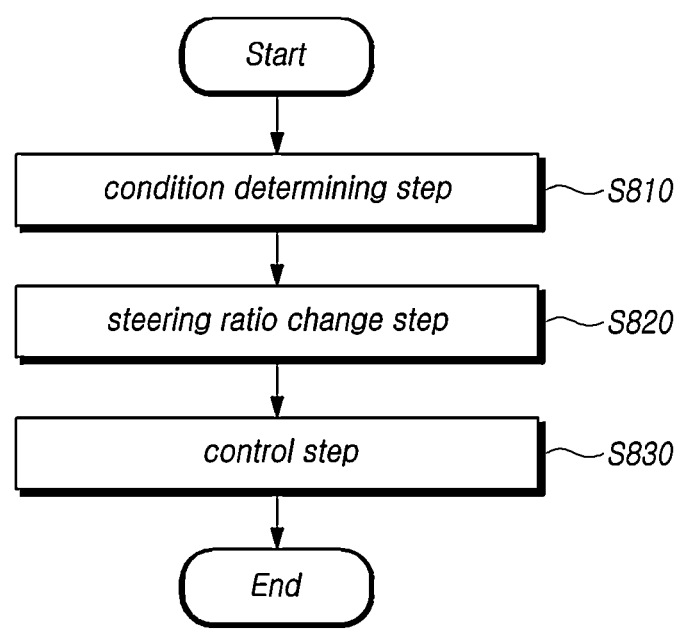
FIG. 8 is a flowchart illustrating a vehicle steering control method according to an embodiment of the disclosure.

FIG. 8 is a flowchart illustrating a vehicle steering control method according to an embodiment of the disclosure.

Referring to FIG. 8, a steering control method of the disclosure may include a condition determining step determining a steering ratio change condition (S810). As an example, the steering control device may determine the steering ratio change condition by determining whether a failure or emergency steering occurs in the steering motor or steering motor control device of the vehicle equipped with the steer-by-wire system. The steering control device may determine that the steering ratio change condition is met when a failure and emergency steering occur. For example, the steering control device may determine that a failure occurs if a failure occurrence signal is detected. The failure occurrence signal may be a flag indicating the failure, generated by the steering motor control device. Specifically, the failure occurrence signal may be detected in a situation in which overheating occurs due to an overload to the applied current of the steering motor, or in a situation in which a steering angle sensor or a steering torque sensor of the steering motor control device is incorrectly mounted or malfunctions.

As another example, the steering control device may determine that emergency steering occurs if the target rack stroke is larger than a preset reference rack stroke. The steering control device may obtain a target rack stroke required by the driver from steering wheel sensor information including steering angle information or steering torque information. The target rack stroke may mean a rack stroke of the rack bar required to generate an appropriate steering assistance force according to steering information. The target rack stroke may mean the output of the steering motor 210 required for the rack bar to linearly move as much as the target. The target rack stroke may mean a rack stroke of the rack bar required to generate an appropriate steering assistance force according to steering information. The target rack stroke may mean the output of the steering motor required for the rack bar to linearly move as much as the target. The reference rack stroke may be a rack stroke corresponding to a specific rack force set in proportion to the rack force at two opposite ends of the rack. As a specific example, the steering control device may set the rack stroke when the rack bar makes a linear motion with 50% of the steering motor output, as the reference rack stroke. However, 50% is merely an example, and embodiments of the disclosure are not limited thereto.

The steering control method may include a steering ratio change step changing the average steering ratio (S820). When it is determined that the steering ratio change condition is met, the steering control device may change the average steering ratio according to the preset virtual C-factor. As an example, when it is determined that the steering ratio change condition is met, the steering control device may change the average steering ratio according to the virtual C-factor set to a value less than 1. In this case, the average steering ratio may be a ratio of the steering angle to angular displacement calculated from rotation angle information about the steering motor at two opposite ends of the steering wheel. Specifically, the average steering ratio may be the ratio of the steering angle of the steering wheel to the average value of the rotation angle of the steering motor while the steering wheel in the state rotated to the maximum in one direction is rotated to the maximum in the opposite direction. As a specific example, if the virtual C-factor is set to ½ when the average steering ratio is 1:8, the steering control device may change the average steering ratio to 1:4.

The steering control method may include a control step adjusting the rack stroke and the rack speed (S830). As an example, the steering control device may control the steering motor output and adjust the rack stroke and rack speed based on the changed average steering ratio. The steering control device may control the output of the steering motor to be repeatedly generated with different values by applying the changed average steering ratio. For example, the steering control device may control to increase the rack stroke by repeatedly generating the output of the steering motor at 0% and 100% of the steering motor output by applying the changed average steering ratio. Accordingly, the steering control device may provide the effect that steering is possible even at the end of the steering wheel. Further, the steering control device may control to reduce the speed of the rack moving to two opposite ends of the rack stroke by controlling the output of the steering motor by applying the changed average steering ratio. This may provide stable steered driving by allowing the road wheel actuator (RWA) to be aligned more stably.

As set forth above, according to the disclosure, there may be provided a vehicle steering control device and method. In particular, there may be provided a steering control device and method for a vehicle, which may secure stably steered driving by controlling the output of the steering motor by changing the average steering ratio when the driver causes urgent steering in a failure situation and adjusting the rack stroke and rack speed.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering control device of a vehicle, comprising:
a condition determining unit determining a steering ratio change condition by determining whether a failure or emergency steering occurs in a steering motor or steering motor control device of the vehicle equipped with a steer-by-wire system;
a steering ratio change unit changing an average steering ratio using a preset virtual C-factor when the steering ratio change condition is determined to be met; and
a controller controlling a steering motor output to adjust a rack stroke and a rack speed based on the changed average steering ratio,
wherein the controller controls to repeatedly generate the steering motor output with different values at a preset period by applying the changed average steering ratio, and
wherein one of the different values is set to 0% of the steering motor output, and another of the different values is set to 100% of the steering motor output.

2. The steering control device of claim 1, wherein the condition determining unit determines that the failure occurs if a failure occurrence signal is detected and determines that the emergency steering occurs if a target rack stroke is larger than a preset reference rack stroke, and determines that the steering ratio change condition is met when the failure and the emergency steering occur.

3. The steering control device of claim 2, wherein the reference rack stroke is a rack stroke corresponding to a specific rack force set in proportion to a rack force at two opposite ends of a rack.

4. The steering control device of claim 1, wherein the steering ratio changing unit changes the average steering ratio using the virtual C-factor set to a value less than 1 if the steering ratio change condition is determined to be met, and wherein the average steering ratio is a ratio of a steering angle to an angular displacement calculated from rotation angle information about the steering motor at two opposite ends of a steering wheel.

5. The steering control device of claim 1, wherein the controller controls to decrease the rack speed moving to two opposite ends of the rack stroke by applying the changed average steering ratio.

6. The steering control device of claim 1, wherein the rack stroke is increased as the steering motor output is repeatedly generated.

7. A steering control method of a vehicle, comprising:
a condition determining step determining a steering ratio change condition by determining whether a failure or emergency steering occurs in a steering motor or steering motor control device of the vehicle equipped with a steer-by-wire system;
a steering ratio change step changing an average steering ratio using a preset virtual C-factor when the steering ratio change condition is determined to be met; and
a control step controlling a steering motor output to adjust and adjusting a rack stroke and a rack speed based on the changed average steering ratio,
wherein the control step controls to repeatedly generate the steering motor output with different values at a preset period by applying the changed average steering ratio, and
wherein one of the different values is set to 0% of the steering motor output, and another of the different values is set to 100% of the steering motor output.

8. The steering control method of claim 7, wherein the control step controls to decrease the rack speed moving to two opposite ends of the rack stroke by applying the changed average steering ratio.

9. The steering control method of claim 7, wherein the condition determining step determines that the failure occurs if a failure occurrence signal is detected and determines that the emergency steering occurs if a target rack stroke is larger than a preset reference rack stroke, and determines that the steering ratio change condition is met when the failure and the emergency steering occur.

10. The steering control method of claim 9, wherein the reference rack stroke is a rack stroke corresponding to a specific rack force set in proportion to a rack force at two opposite ends of a rack.

11. The steering control method of claim 7, wherein the steering ratio change step changes the average steering ratio using the virtual C-factor set to a value less than 1 if the steering ratio change condition is determined to be met, and wherein the average steering ratio is a ratio of a steering angle to an angular displacement calculated from rotation angle information about the steering motor at two opposite ends of a steering wheel.

12. The steering control method of claim 7, wherein the rack stroke is increased as the steering motor output is repeatedly generated.

* * * * *